T. E. C. BRINLY.

Plow.

No. 2,726. Reissued Aug 13, 1867.

Inventor.

Jas A Service
Witnesses. M B Livingston

T. E. C. Brinley
Per Munn & Co
Attorneys

N. PETERS, PHOTO-LITHOGRAPHER, WASHINGTON, D. C.

UNITED STATES PATENT OFFICE.

T. E. C. BRINLY, OF LOUISVILLE, KENTUCKY.

IMPROVEMENT IN PLOWS.

Specification forming part of Letters Patent No. 55,999, dated July 3, 1866; Reissue No. 2,726, dated August 13, 1867.

*To all whom it may concern:*

Be it known that I, T. E. C. BRINLY, of Louisville, in the county of Jefferson and State of Kentucky, have invented certain new and useful Improvements in the Construction of Plows; and I do hereby declare that the following is a clear, full, and exact description thereof, reference being had to the accompanying drawings, making part of this specification, in which—

Figure 1:
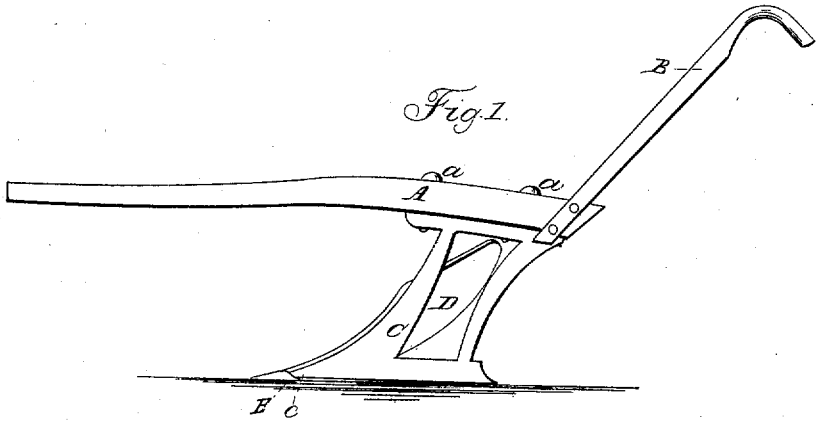
Figure 2:
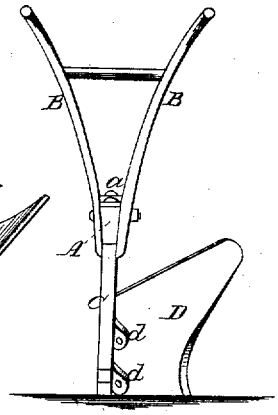
Figure 3:
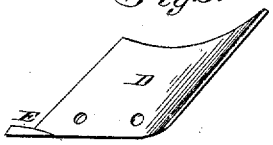

Figure 1 is a side elevation. Fig. 2 is a rear elevation; and Fig. 3, a plan or face view of the mold-board, shown detached.

To enable others skilled in the arts to construct and use my invention, I will proceed to describe the same.

The invention consists, first, in constructing the landside and standard of a single piece of cast-iron; and, second, in constructing the mold-board and point in one piece, with a hook or shoulder on its under surface, to engage upon and secure it to the front end of the landside.

To construct a plow on my plan I cast the landside L, of proper size and form, with two vertically-projecting bars, C and D, connected at their upper end by a horizontal bar or flange, *e*, as represented in Fig. 1, the bars C and D forming the standard. Upon the right side of the front bar, C, are cast with it two small lugs or ears, *d*, as shown in Fig. 2, these ears being set at an inclination to correspond with the under surface of the mold-board when the latter is in place. The mold-board I is constructed either of steel or cast-iron, with the point E attached, all in one piece. On the under side, near the front end or point, a hook, *c*, is formed, to hook over the point of the landside, as shown in Fig. 1, this hook, together with a couple of bolts which pass through the mold-board and the ears *d*, serving to secure the mold-board firmly in place.

It is obvious that instead of making the hook inclined, as shown, it may be simply a square shoulder, fitted to abut against the front end of the landside L, which in that case will be made square at its point to correspond.

The horizontal bar or flange *e* serves as a means of attaching the plow proper to the beam, which is done in a very simple and efficient manner by means of the bolts *a*. It will be observed that the front end of the flange *e* is slightly raised, which throws the point down, so as to make the plow run at the proper depth, and when it is secured to the beam the front end of the flange is set to land, so as to insure the cutting of a furrow of proper width.

By this construction I make a plow that is exceedingly simple and cheap, especially adapted to the wants of the region for which it is intended.

Having thus described my invention, what I claim is—

1. Constructing a plow with its landside L and the standards C D connected by the flange *e*, and having the ears *d* on the part C, all cast in a single piece, as described.

2. The mold-board I, with the point E, formed in a single piece, and having a shoulder or projection, *c*, formed on its under side to rest against the front of the landside and assist in holding the mold-board in place, substantially as described.

T. E. C. BRINLY.

Witnesses:
NEILL BEGHTOL,
C. VONDERHITE.